United States Patent
Brinke-Seiferth et al.

(10) Patent No.: US 6,383,385 B1
(45) Date of Patent: May 7, 2002

(54) FILTER UNIT FOR THE PHYSICAL ELIMINATION OF MICROBES, SUSPENDED MATTER AND SOLIDS FROM WATER

(75) Inventors: Stephan Brinke-Seiferth; Rainer Plass, both of Hamburg (DE)

(73) Assignee: Delphin Filtertechnik GmbH, Hamburg (DE)

( * ) Notice: Subject to any disclaimer, the term of this patent is extended or adjusted under 35 U.S.C. 154(b) by 0 days.

(21) Appl. No.: 09/551,076

(22) Filed: Apr. 18, 2000

(30) Foreign Application Priority Data

Apr. 22, 1999 (DE) .......................... 199 18 221

(51) Int. Cl.[7] .............................. B01D 63/02
(52) U.S. Cl. ............ 210/433.1; 210/117; 210/321.79; 210/321.8; 210/321.88; 210/321.89; 210/416.3; 210/422; 210/434
(58) Field of Search .................... 210/117, 321.78, 210/321.79, 321.8, 321.87, 321.88, 321.89, 416.3, 422, 433.1, 434, 500.23

(56) References Cited

U.S. PATENT DOCUMENTS 3,365,061 A * 1/1968 Bray ........................ 210/416.3
4,676,896 A 6/1987 Norton ........................ 210/192
4,713,175 A 12/1987 Bray ........................... 210/259
4,980,056 A 12/1990 Norton ........................ 210/137
5,045,198 A 9/1991 Norton .................. 210/321.87
5,110,476 A 5/1992 Taylor ........................ 210/640
5,567,311 A * 10/1996 Jang ........................... 210/243

FOREIGN PATENT DOCUMENTS

| DE | 3712491 A1 | 10/1987 |
| EP | 0 396 928 | 11/1990 |
| JP | 08252436 | 10/1996 |
| JP | 11156166 | 6/1999 |

* cited by examiner

Primary Examiner—John Kim
(74) Attorney, Agent, or Firm—Roberts & Mercanti, LLP

(57) ABSTRACT

The invention relates to a filter device for the physical elimination of microbes, suspended matter and solids from water, which in a housing has a filter insert made of 200 to 10000 hollow-fiber membranes with a defined pore width between 0.001 and 1.0 μm and which can be mounted on a water tap with its top side. A disadvantage of previously known filter devices is that deposits will adhere to the fibers. In order to remedy this drawback, the bottom side of the device of the invention features separate outlets for filtered and unfiltered water and at least in the outlet for the unfiltered water a valve is fitted with which this outlet can be closed.

10 Claims, 3 Drawing Sheets

FILTER UNIT FOR THE PHYSICAL ELIMINATION OF MICROBES, SUSPENDED MATTER AND SOLIDS FROM WATER

BACKGROUND OF THE INVENTION

1. Field of the Invention

The invention relates to a filter device for the physical elimination of microbes, suspended matter and solids from water.

2. Description of the Related Art

A filter device similar to that of this invention is known from U.S. Pat. No. 4,980,056. A disadvantage of this previously known theory, however, is that only one retentate discharge opening is provided. As a result, the fibres in the flow of water from the outside are not flushed in a defined manner and deposits adhere to a large number of the fibres.

In the further state of the art, reference is also made to U.S. Pat. No. 4,713,175, AS 4,676,896, U.S. Pat. No. 5,045,198 and DE 37 12 491 A1.

The invention has the purpose of improving the filter device mentioned in the introduction so that the water flow from a drinking water supply pipe can be sterilised and solids completely removed in a defined manner according to requirements.

With the invention this purpose is fulfilled by means of the features in the main claim. On the underside of the housing there are two outlets, one of which can be closed as required by means of a valve. The main flow passes through the hollow fibres and discharges from the outlet fitted with a valve. This flow is not filtered. If filtered water is required, the outlet fitted with a valve is closed. The water passes through the walls of the hollow-fibre membranes with defined pore size and flows out of the housing through the second outlet. The filter acts as a dead-end filter. This flow of permeate is free of solids and exhibits a bacterial concentration which is 7 logarithmic stages lower than the inflow. If no more sterilised water is required, the valve can be reopened. This terminates dead-end operation and the filter is automatically flushed by the main flow. No back flushing is required to clean the membrane. The filtration unit according to the invention can be mounted on any water tap.

SUMMARY OF THE INVENTION

The invention provides a filter unit for the physical elimination of microbes, suspended matter and solids from water, which comprises housing which has a filter insert made of from about 200 to about 10000 hollow-fibre membranes with a defined pore width of from about 0.001 to about 1.0 $\mu$m and which can be mounted on a water tap with its top side, wherein the bottom side features separate outlets for filtered and unfiltered water and at least in the outlet for the unfiltered water a valve is fitted with which this outlet can be closed.

The filter insert features a perforated ring filled with hollow fibres, the hollow-fibre membranes being bonded with each other at their ends at the top and bottom sides of the filter insert and connected with the ring in such a way that only the openings of the hollow fibres remain as openings in the ring surfaces, so that the water to be treated can flow vertically through the hollow-fibre membranes and the permeate through the hollow-fibre walls to the outside of the hollow fibres.

The invention also provides a filter unit for the physical elimination of microbes, suspended matter and solids from water, which comprises a housing having a filtered water path and an unfiltered water path;

the housing having a top side having an inlet for unfiltered water; a bottom side having an outlet for filtered water from the filtered water path and a different outlet for unfiltered water from the unfiltered water path, which outlet for unfiltered water is fitted with a valve;

a filter insert inside of the housing, which filter insert comprises from about 200 to about 10000 hollow-fibre membranes having side walls with pores through the side walls, which pores have a pore width of from about 0.001 $\mu$m to about 1.0 $\mu$m; which hollow-fibre membranes have a length defining an open entrance end and an opposite open exit end thereof, which membranes extend along their length such that the open entrance end of each membrane is positioned adjacent to the top side of the housing in fluid communication with the inlet, and the open exit end of each membrane is positioned adjacent to the bottom side of the housing in fluid communication with the outlet for unfiltered water;

the unfiltered water path extending from the inlet through the length of the hollow-fibre membranes, through an unfiltered water conduit and then out the outlet for unfiltered water;

the filtered water path extending from the inlet thorough a part of the length of the hollow-fibre membranes, through the side wall pores, through a filtered water conduit and then out the outlet for filtered water.

The filter insert comprises a perforated ring filled with the hollow-fibre membranes, hollow-fibre membranes being bonded with each other at their open entrance ends and open exit ends and connected with the ring such that only the open ends of the hollow fibres remain as openings in the ring surfaces, so that water to be treated can flow through the hollow-fibre membranes and the permeate through the walls.

BRIEF DESCRIPTION OF THE DRAWINGS

In the following the invention is explained using several drawings to provide a better understanding.

DETAILED DESCRIPTION OF THE PREFERRED EMBODIMENT

Figure 1:
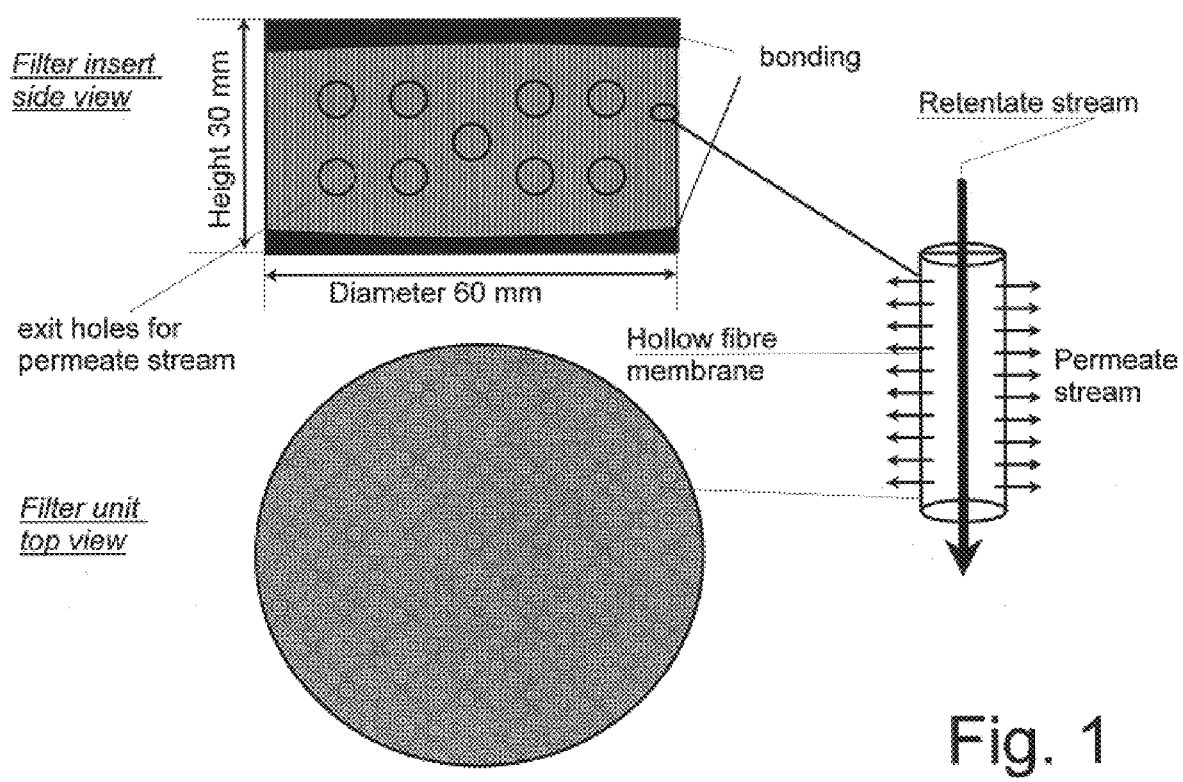
FIG. 1 a schematic of the filter insert for microbe reduction.
Figure 2:
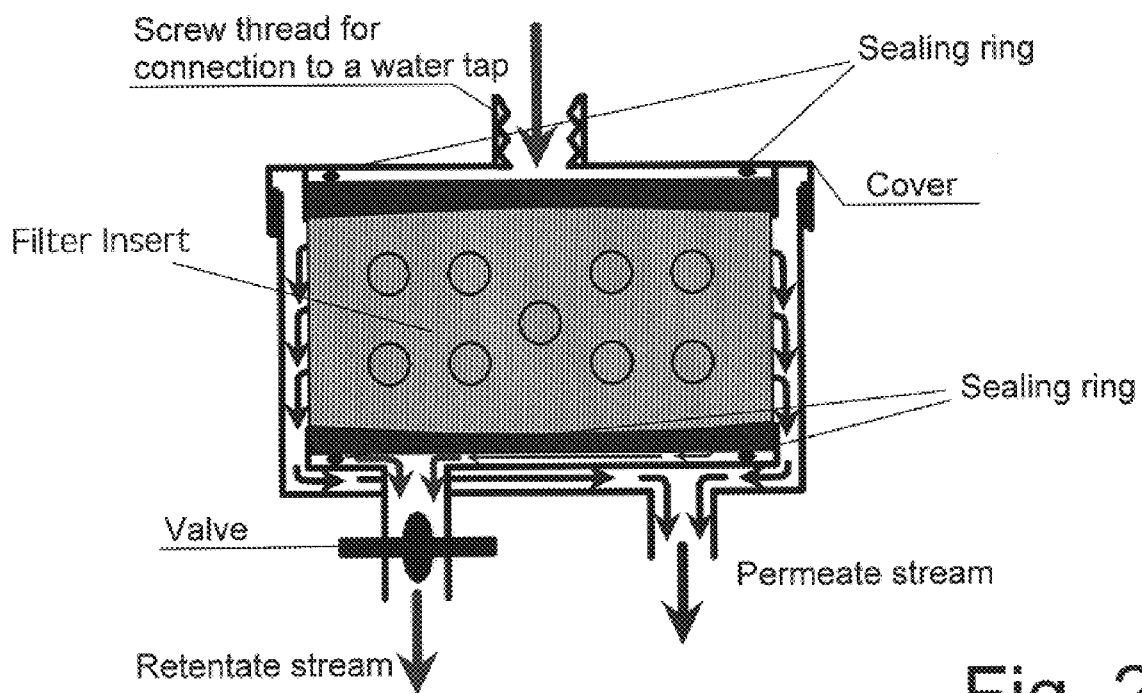
FIG. 2 a schematic of the housing according to the invention in which the filter is inserted and which can be mounted on any tap.

From FIG. 1 it can be seen that the filter insert contains a large number (as a rule 2000 to 4000) of hollow-fibre membranes through which the water flows in a vertical direction. The permeate (filtration stream) discharges through the walls of the hollow-fibre membranes. The walls consist of a membrane with a defined pore width which with a support layer attain a defined thickness. The filtration stream (permeate) flows sideways out of the discharge holes for the permeate shown in FIG. 1. The filter insert is placed in a housing which can be mounted on a water tap. The housing is constructed in such a way that the retentate stream (containing microbes) is securely separated from the permeate stream (filtrate). The water flows through the filter unit as described. The permeate stream is separated from the retentate stream. Accordingly, there are two outlets on the underside of the housing. The outlet shown in FIG. 2 for the retentate stream is fitted with a valve which can be operated by hand. This makes it possible to interrupt the retentate stream and to operate the filter as a dead-end filter. In this mode the entire stream is filtered and on the underside only the filtered permeate stream discharges, with the number of microbes reduced by 7 orders of magnitude compared with the stream discharging directly from the water tap. If the valve for the retentate stream is opened again the main stream can flow through the hollow fibres again. In the process the filter is cleaned of filtrate residues which flow off with the retentate stream.

Figure 3:
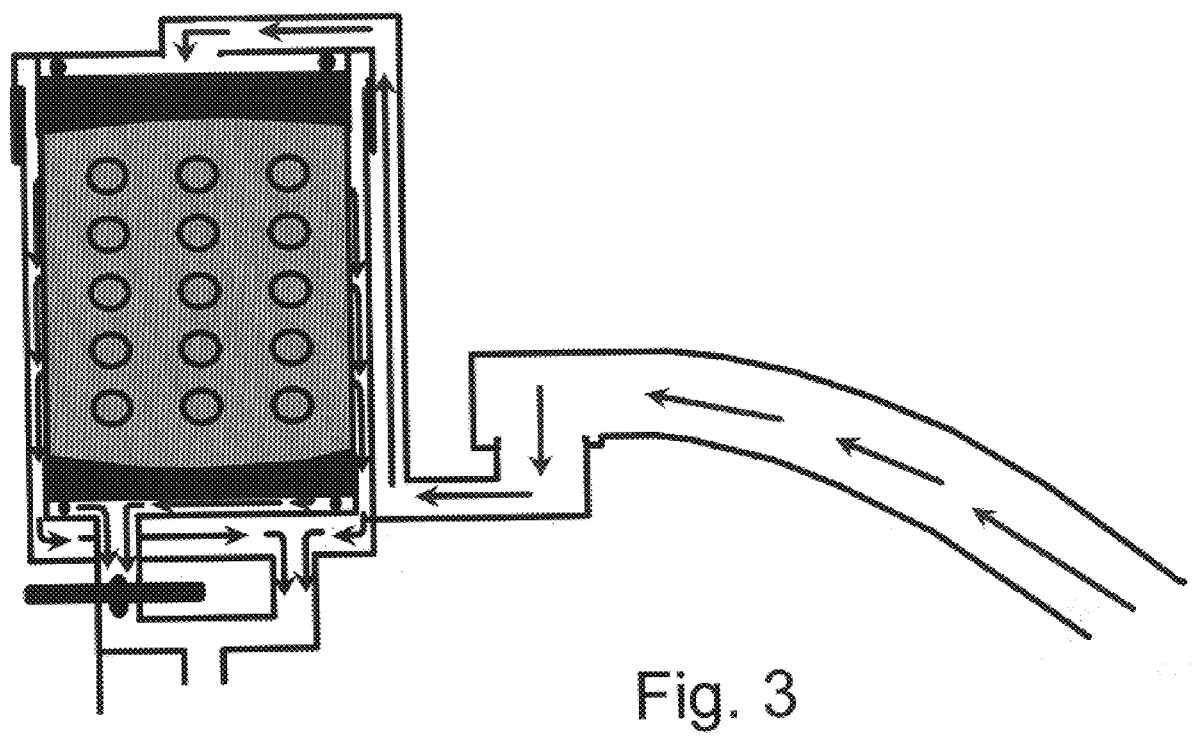
FIG. 3 a schematic of a further embodiment of the filter unit according to the invention.

The further embodiment of the filter device according to the invention shown in FIG. 3 assumes that the unit is mounted sideways on a water tap and the flow from the water tap is routed to the top side of the unit, as indicated by the arrows. The lower part of the figure also shows that the two separate outlets for filtered and unfiltered water can be combined to form one outlet.

EXAMPLE

The filter is connected to a water tap. The pipe system is supplied from a tank on the roof of a house, as is customary in many (southern) countries. The water stream flows through the hollow-fibre membrane. Both outlets are opened. The water stream corresponds to the water from the pipe system in terms of quality and number of microbes. The water can be used for washing dishes and clothes. If drinking water is required the manually operated valve on the underside of the housing can be closed. Now the entire water flow is filtered and the water discharging from the filter housing is free of solid matter and the number of bacteria has been reduced by 7 orders of magnitude. This means that given 10,000,000 microbes per millimetre in the supply flow, 1 microbe per millimetre remains in the permeate. Depending on the pressure in the pipe system a filtered flow of at least 4 liters per minute is attained. When microbe-reduced water is no longer required, the valve on the underside of the filter housing can be reopened.

What is claimed is:

1. A filter unit for the physical elimination of microbes, suspended matter and solids from water, which comprises a housing which has a filter insert made of from about 200 to about 10000 hollow-fibre membranes with a defined pore width of from about 0.001 to about 1.0 $\mu$m, which housing has a top side which can be mounted on a water tap, and a bottom side having separate outlets for filtered and unfiltered water, and wherein the outlet for the unfiltered water comprises an outlet closing valve.

2. The filter unit according to claim 1, wherein the filter insert features a perforated ring filled with hollow fibres, the hollow-fibre membranes being bonded with each other at their ends at the top and bottom sides of the filter insert and connected with the ring in such a way that only the openings of the hollow fibres remain as openings in the ring surfaces, so that the water to be treated can flow vertically through the hollow-fibre membranes and the permeate through the hollow-fibre walls to the outside of the hollow fibres.

3. The filter unit according to claim 1, which comprises a screw thread on its top side for connection of the filter unit to a water tap.

4. The filter unit according to claim 1, which comprises a mount on a side of the housing, which mount is connectable to a water tap, said mount being further connected to a conduit within the housing which is capable of directing a supply flow of water through the filter insert at a top side of the filter insert.

5. The filter unit according to claim 1, wherein the two separate outlets for filtered and unfiltered water are combined to form one outlet.

6. A filter unit for the physical elimination of microbes, suspended matter and solids from water, which comprises a housing having a filtered water path and an unfiltered water path;

the housing having a top side having an inlet for unfiltered water; a bottom side having an outlet for filtered water from the filtered water path and a different outlet for unfiltered water from the unfiltered water path, which outlet for unfiltered water is fitted with a valve;

a filter insert inside of the housing, which filter insert comprises from about 200 to about 10000 hollow-fibre membranes having side walls with pores through the side walls, which pores have a pore width of from about 0.001 $\mu$m to about 1.0 $\mu$m; which hollow-fibre membranes have a length defining an open entrance end and an opposite open exit end thereof, which membranes extend along their length such that the open entrance end of each membrane is positioned adjacent to the top side of the housing in fluid communication with the inlet, and the open exit end of each membrane is positioned adjacent to the bottom side of the housing in fluid communication with the outlet for unfiltered water;

the unfiltered water path extending from the inlet through the length of the hollow-fibre membranes, through an unfiltered water conduit and then out the outlet for unfiltered water;

the filtered water path extending from the inlet thorough a part of the length of the hollow-fibre membranes, through the side wall pores, through a filtered water conduit and then out the outlet for filtered water.

7. The filter unit of claim 6 wherein the inlet has a screw fitting for mounting on a water tap.

8. The filter unit of claim 6, wherein the filter insert comprises a perforated ring filled with the hollow-fibre membranes, hollow-fibre membranes being bonded with each other at their open entrance ends and open exit ends and connected with the ring such that only the open ends of the hollow fibres remain as openings in the ring surfaces, so that water to be treated can flow through the hollow-fibre membranes and the permeate through the walls.

9. The filter unit of claim 6, which comprises a mount on a side of the housing, which mount is connectable to a water tap, said mount being further connected to a conduit within the housing which is capable of directing a supply flow of water through the filter insert at the top side of the filter insert.

10. The filter unit of claim 6, wherein the two separate outlets for filtered and unfiltered water are combined to form one outlet.

* * * * *